United States Patent [19]

Toyoda et al.

[11] Patent Number: 5,683,196
[45] Date of Patent: Nov. 4, 1997

[54] BALL JOINT

[75] Inventors: Michihito Toyoda; Yoshihiro Suzuki, both of Hamamatsu; Keiichiro Suzuki, Shizuoka, all of Japan

[73] Assignee: Kabushiki Kaisha Somic Ishikawa, Tokyo, Japan

[21] Appl. No.: 630,058

[22] Filed: Apr. 12, 1996

[30] Foreign Application Priority Data

Apr. 12, 1995 [JP] Japan .................................. 7-086611

[51] Int. Cl.⁶ .................................................. F16C 11/06
[52] U.S. Cl. .............................. 403/131; 403/22; 403/120; 411/533
[58] Field of Search .............................. 403/120, 131, 403/133, 22; 411/222, 397, 533, 155, 156, 399

[56] References Cited

U.S. PATENT DOCUMENTS

| | | | |
|---|---|---|---|
| 2,672,069 | 3/1954 | Mitchell | 411/533 X |
| 2,735,470 | 2/1956 | Poupitch | 411/155 X |
| 2,768,848 | 10/1956 | Mitchell et al. | 403/131 |
| 3,013,829 | 12/1961 | Marquis | 403/133 |
| 3,130,993 | 4/1964 | McCleary | 403/131 |
| 3,347,576 | 10/1967 | Templeton | 403/133 X |
| 3,408,124 | 10/1968 | Melton et al. | 403/131 X |
| 4,197,027 | 4/1980 | Scheerer | 403/133 X |
| 4,433,854 | 2/1984 | Smith | 403/131 X |
| 4,596,406 | 6/1986 | Van Vleet et al. | 403/131 X |
| 4,954,006 | 9/1990 | Suzuki et al. | 403/133 X |
| 5,267,805 | 12/1993 | Ueno et al. | 403/133 X |
| 5,511,301 | 4/1996 | McGuire | 411/533 X |

FOREIGN PATENT DOCUMENTS

| | | | |
|---|---|---|---|
| 623501 | 7/1961 | Canada | 403/133 |
| 63-135609 | 6/1988 | Japan | 403/120 |
| 467789 | 6/1937 | United Kingdom | 403/131 |
| 805403 | 12/1958 | United Kingdom | 403/131 |

Primary Examiner—Anthony Knight
Assistant Examiner—Andrea Chop
Attorney, Agent, or Firm—Morrison Law Firm

[57] ABSTRACT

A flange portion of a ball stud includes a seat surface which abuts a junction face of a concurrent rotation prevention plate. By ensuring that the contact face of the concurrent rotation prevention plate has a larger area than an area of the seat surface of the flange portion of the ball stud, the frictional force between an attached item and the contact face of the concurrent rotation prevention plate is greater than a rotational force applied to the ball stud when a nut is affixed to the ball stud. The ball stud is thus prevented from concurrently turning with the nut during a tightening or loosening operation.

6 Claims, 5 Drawing Sheets

BALL JOINT

BACKGROUND OF THE INVENTION

The present invention relates to a ball joint, and in particular, to a ball joint used in a suspension system of an automobile, particularly at a joint where a stabilizer is connected to an absorber.

Referring to FIG. 7, a conventional ball and socket joint includes a ball joint 4. A ball case 1 of ball joint 4 receives a ball portion (not shown) of a ball stud 2 in a ball seat (not shown). A dust cover 3 protects the ball and socket joint against environmental factors such as dust, water, and other inimical substances. A stud portion 5 of ball stud 2 extends from the ball portion (not shown), thereby projecting from ball case 1. A seat surface 5a of stud portion 5 faces the ball portion (not shown) of ball stud 2. A threaded portion 5b of stud portion 5 is at an end of stud portion 5 away from the ball portion (not shown).

A ball joint attachment 6 is fastened on stud portion 5 against seat surface 5a by placing ball joint attachment 6 over stud portion 5 and screwing a nut 7 onto threaded portion 5b. Nut 7 is mined with a tool such as a wrench 8 in such a direction as to tighten nut 7 onto threaded portion 5b, thereby fastening ball joint attachment 6 securely against seat surface 5a.

As with any standard ball and socket joint, ball stud 2 is capable of rotating as it slides against the ball seat (not shown). Therefore, if a rotational force of nut 7 exceeds a frictional resistance between seat surface 5a and ball joint attachment 6, fastening is impossible since ball stud 2 turns with nut 7 as nut 7 is turned by wrench 8. In actual practice, a hexagon socket screw key 9 is fitted into a hexagon socket 5c at the end of stud portion 5 in order to prevent ball stud 2 from turning with nut 7 during the tightening process. In this fashion, ball joint attachment 6 is clamped onto seat surface 5a and consequently onto ball stud 2. Nut 7 is removed in a similar manner. That is, hexagon socket screw key 9 holds ball stud 2 in place while nut 7 is turned.

This arrangement requires using hexagon screw key 9 or similar device to prevent concurrent revolution of ball stud 2 while screwing or unscrewing nut 7.

OBJECTS AND SUMMARY OF THE INVENTION

Accordingly, it is an object of the present invention to provide a ball and socket joint which is easily attached or removed from a ball joint attachment.

It is another object of the present invention to provide a ball and socket joint which attaches and detaches from a ball joint attachment without the need for a tool to prevent the ball stud from concurrent revolution with the nut when the nut is turned.

Briefly stated, a flange portion of a ball stud includes a seat surface which abuts a contact face of a concurrent rotation prevention plate. By ensuring that the contact face of the concurrent rotation prevention plate has a larger area than an area of the seat surface of the flange portion of the ball stud, the frictional force between an attached item and the contact face of the concurrent rotation prevention plate is greater than a rotational force applied to the ball stud when a nut is affixed to the ball stud. The ball stud is thus prevented from concurrently mining with the nut during a tightening or loosening operation.

According to an embodiment of the invention, a ball joint includes a ball stud having a ball portion at one end and a stud portion at an other end, the stud portion having a threaded portion, a seat surface on a portion of the ball stud adjacent the threaded portion and facing towards the threaded portion, the threaded portion being effective for receiving an attached item thereon and effective for securing the attached item to the ball stud by screwing a nut onto the threaded portion so that the attached item is between the ball portion and the nut, a concurrent rotation prevention plate affixed to the stud portion of the ball stud so that it is clamped against the seat surface, a contact face on the concurrent rotation prevention plate for contacting the attached item, and the contact face having a larger area than the seat surface.

According to another embodiment of the invention, a ball joint includes a ball stud having a ball portion at one end and a stud portion at an other end, the stud portion having a threaded portion, a seat surface on a portion of the ball stud adjacent the threaded portion and facing towards the threaded portion, the threaded portion being effective for receiving an attached item thereon and effective for securing the attached item to the ball stud by screwing a nut onto the threaded portion so that the attached item is between the ball portion and the nut, a concurrent rotation prevention plate affixed to the stud portion of the ball stud so that it is clamped against the seat surface, a contact face on the concurrent rotation prevention plate for contacting the attached item, the contact face having a larger area than the seat surface, the threaded portion of the stud portion having a minor diameter D2 and a major diameter D3, an unthreaded base portion of the stud portion having a diameter D 1, the diameter D 1 being greater than the minor diameter D2, the major diameter D3 being greater than the diameter D1, the concurrent rotation prevention plate having a threaded hole substantially centered therein, the threaded hole having a minor diameter D4, the minor diameter D4 being greater than the minor diameter D2, and the diameter D 1 being greater than the minor diameter D4.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
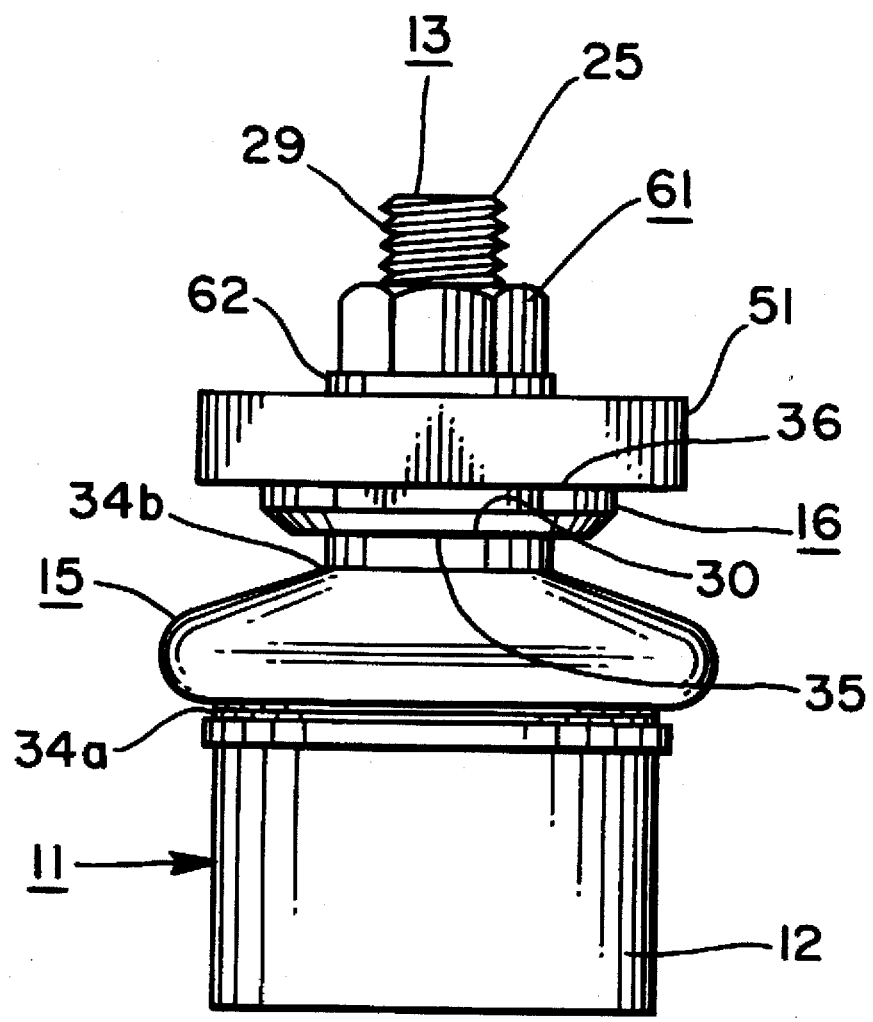
FIG. 1 is a side view of a ball joint according to an embodiment of the present invention.
Figure 2:
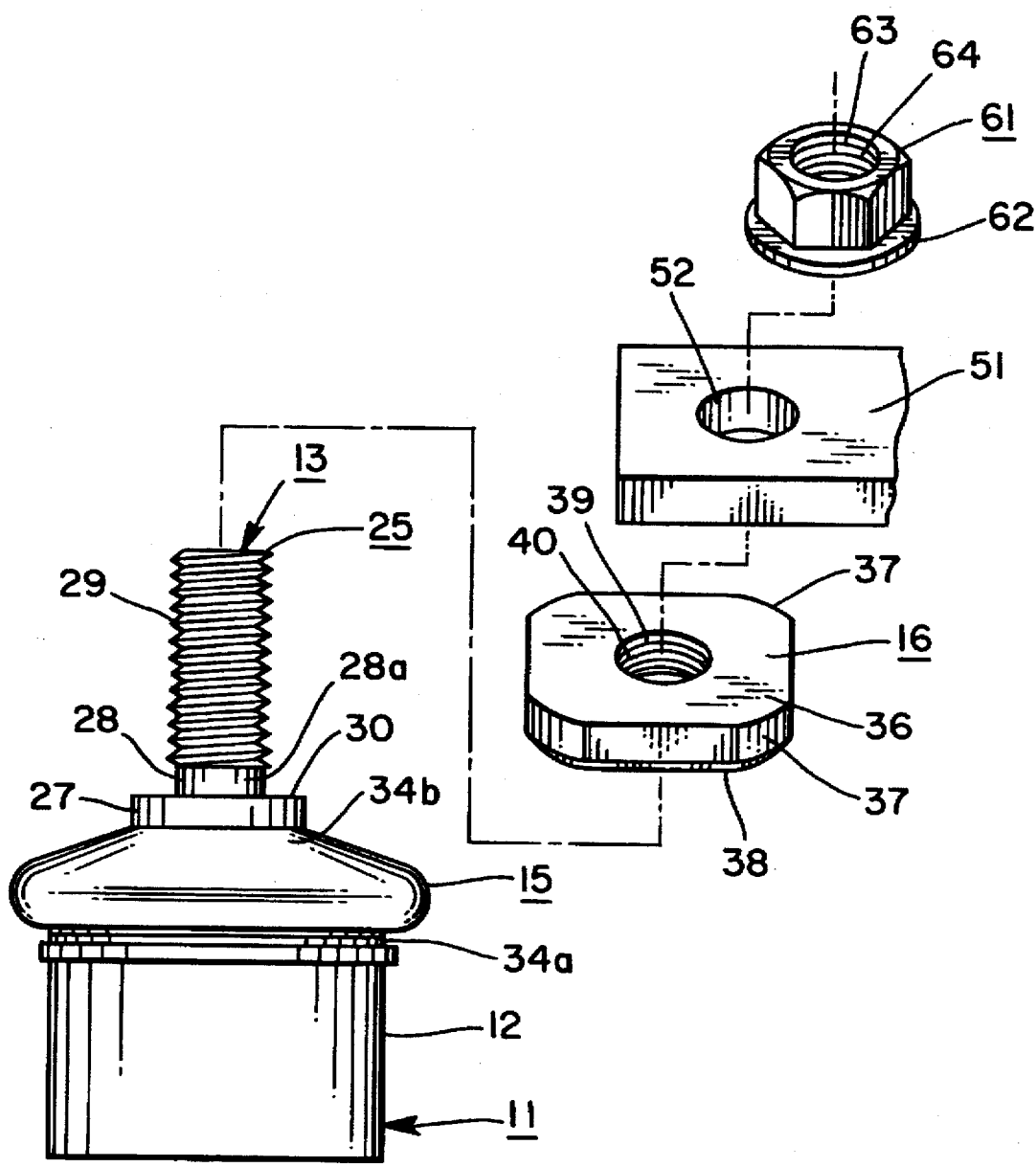
FIG. 2 is a partially exploded perspective view of the embodiment of FIG. 1.
Figure 3:
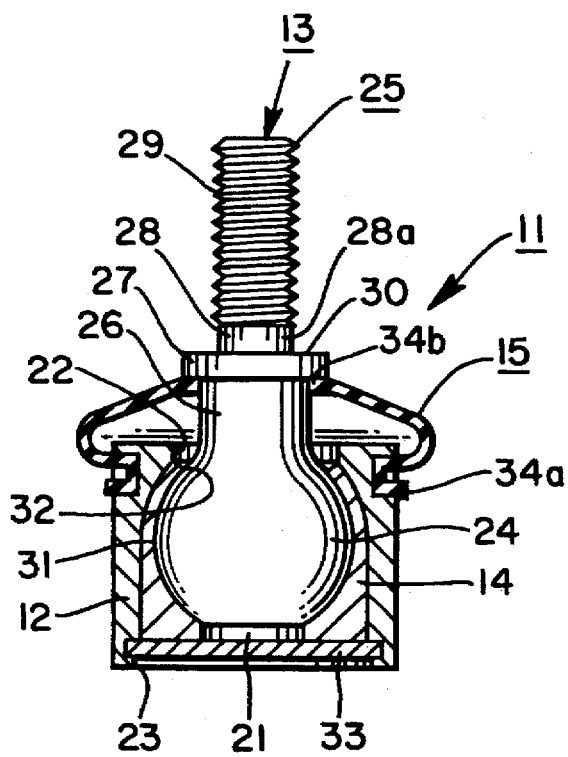
FIG. 3 is a sectional view of the ball joint of the embodiment of FIG. 1.

Referring to FIGS. 1–3, a ball joint body 11 includes a ball stud 13 inside a ball case 12. A ball seat 14 ensures proper fitting of a ball portion 24 on one end of ball stud 13 within ball case 12. A stud portion 25 on the other end of ball stud 13 includes an external thread 29 for receiving a nut 61 thereon. Shank portions 26 and 28 connect ball portion 24 with stud portion 25. A flange portion 27 limits downward movement of any item fitted onto stud portion 25. A base portion 28a extends between flange portion 27 and external thread 29.

Ball case 12 is substantially cylindrical in shape with an aperture 23 at one end for receiving ball stud 13 during assembly. An aperture 22 at an other end of ball case 12 permits shank portion 26, flange portion 27, shank portion 28, and stud portion 25 to extend beyond ball case 12 after assembly.

A fitting portion 31 of ball seat 14 is a spherical surface for receiving ball portion 24 therein. An aperture 32 in ball seat 14 having a diameter smaller than that of ball portion 24 is formed at an end of fitting portion 31 so that stud portion 25 projects from aperture 32. With this configuration, ball seat 14 containing ball portion 24 of ball stud 13 is inserted through aperture 23 into an inner chamber 21 of ball case 12 and held in ball case 12 by means of stopper plate 33 that blocks aperture 23.

A dust cover 15 protects ball portion 24 and ball seat 14 from an external environment. Dust cover 15 is formed essentially in a bell shape by an elastic such as rubber or similar material. A fitting portion 34a of dust cover 15 fits around an outer perimeter of ball case 12. A fitting portion 34b fits around an outer perimeter of shank portion 26 of ball stud 13.

An attached item 51, such as, for example, a stabilizer, an absorber, or similar item used for the suspension system of an automobile, has a portion formed in the shape of a plate with an insertion hole 52 for receiving stud portion 25 of ball stud 13 therethrough.

Nut 61 is preferably a hexagon nut having a washer 62 at one end. A through hole 63 centered in nut 61 has an internal thread 64 to be screwed around external thread 29. When attaching attached item 51 to ball stud 13, insertion hole 52 of attached item 51 is placed over stud portion 25 of ball stud 13. Nut 61 is screwed around external thread 29 of stud portion 25. Nut 61 is then turned in a tightening direction, thereby securing attached item 51 against a concurrent rotation prevention plate 16.

A contact face 36 of concurrent rotation prevention plate 16 contacts attached item 51. A junction face 35 on an underside of concurrent rotation prevention plate 16 contacts a seat surface 30 of a flange portion 27 of ball stud 13. A first contact area between contact face 36 and attached item 51 is greater than a second contact area between junction face 35 and seat surface 30, thereby ensuring a frictional force in the first contact area is greater than a rotational force imparted through tightening nut 61. Rotation of ball stud 13 concurrently with nut 61 is thus prevented.

When nut 61 contacts attached item 51, tightening torque applied to nut 61 creates axial force on ball stud 13 which in turn produces rotational force, causing ball stud 13 to rotate concurrently with nut 61. If the frictional force at the surface where attached item 51 is in contact with ball stud 13 exceeds the rotational force, nut 61 is tightened. However, in cases where the frictional force is smaller than the rotational force, concurrent rotation of ball stud 13 results.

Concurrent rotation prevention plate 16 is preferably fastened beforehand to a commonly available general purpose ball joint body 11. Attached item 51 is secured to concurrent rotation prevention plate 16 simply by using nut 61 at the assembly stage. Use of a hexagon socket screw key or the like to prevent concurrent rotation of ball stud 13 is therefore not required.

Attached item 51 is easily removed simply by loosening nut 61 without the aid of a hexagon socket screw key since concurrent rotation of ball stud 13 is prevented.

Figure 4:
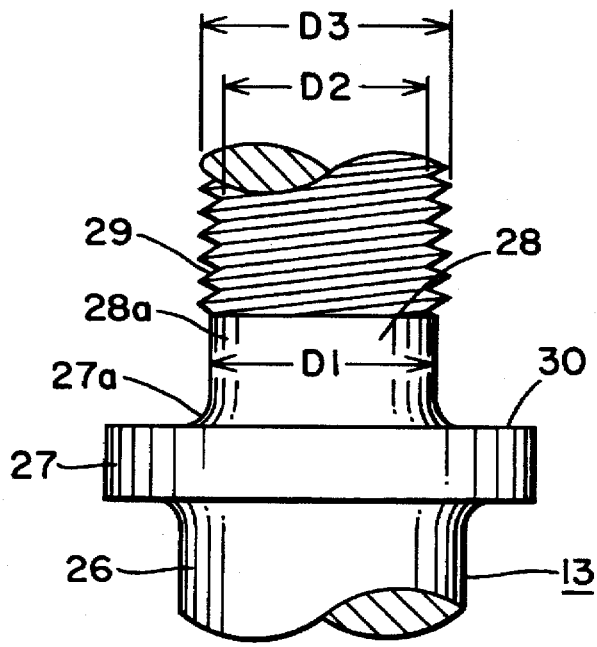
FIG. 4 is an enlarged side view of a part of a ball stud according to the embodiment of FIG. 1.

Referring to FIG. 4, shank portion 26 of stud portion 25 of ball stud 13 has a larger diameter than shank portion 28. Flange portion 27 projects outward beyond shank 26. Shank portion 28 has a smaller diameter than shank portion 26 and flange portion 27. External thread 29 is formed around a surface of shank portion 28 except for base portion 28a. A surface of flange portion 27 facing the end of stud portion 25 is seat surface 30. A diameter D1 of shank portion 28 is greater than a minor diameter D2 of external thread 29 and smaller than a major diameter D3 of external thread 29. That is, D1, D2, and D3 satisfy the inequality $D2<D1<D3$.

Figure 5:
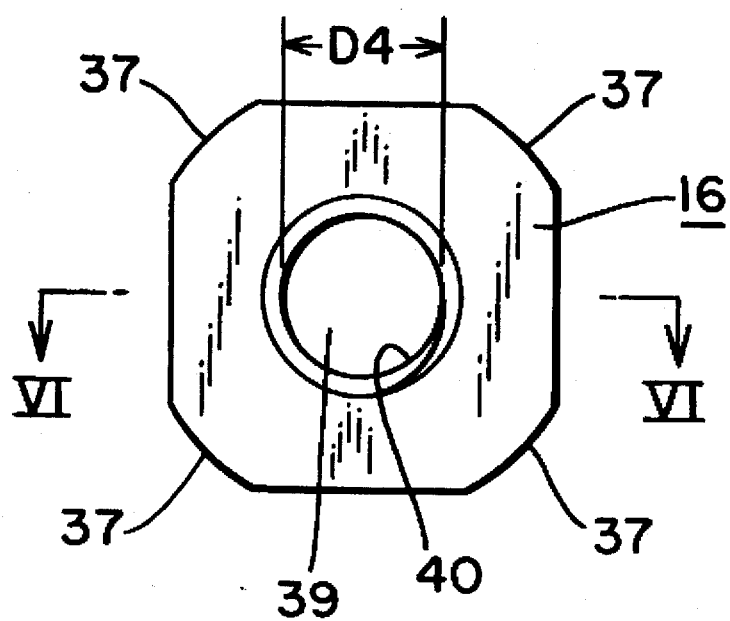
FIG. 5 is a top view of a concurrent rotation prevention plate according to the embodiment of FIG. 1.
Figure 6:
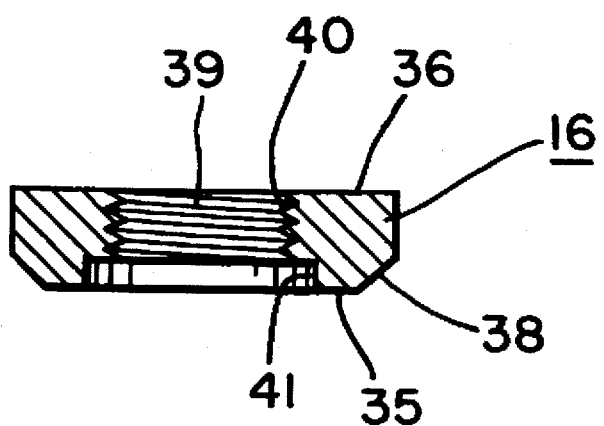
FIG. 6 is a sectional view of the concurrent rotation prevention plate of FIG. 5 taken along the line VI—VI.
Figure 7:
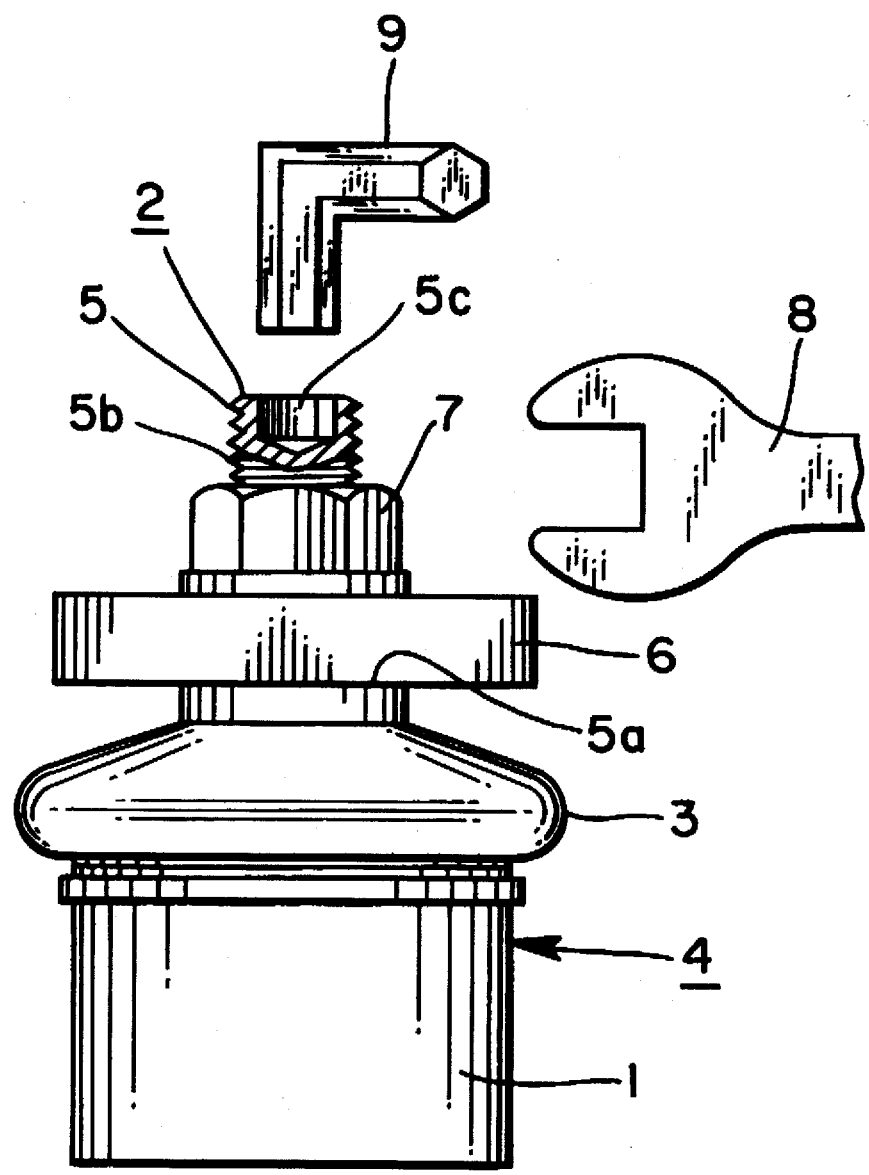
FIG. 7 is a conventional ball joint apparatus according to the prior art.

Referring to FIGS. 2, 5, and 6, concurrent rotation prevention plate 16 is in an essentially square plate larger than seat surface 30. Junction face 35 abuts seat surface 30, while contact face 36 abuts attached item 51. Four corners of an outer perimeter of concurrent rotation prevention plate 16 are chamfered into arc-shaped chamfered portions 37. Likewise, chamfered portions 38 are formed at corners of junction face 35. A through hole 39, which has an internal thread portion 40 at its inner surface, is formed at a center of concurrent rotation prevention plate 16. An annular recess 41 is formed in junction face 35 at an end of through hole 39. Internal thread portion 40 engages external thread 29 of ball stud 13, with a minor diameter D4 of internal thread portion 40 greater than minor diameter D2 of external thread 29 and smaller than diameter D1 of base portion 28a. That is, D1, D2, and D4 satisfy the inequality $D2<D4<D1$. The area of contact face 36 is greater than the area of seat surface 30.

By screwing internal thread portion 40 of concurrent rotation prevention plate 16 around external thread 29 of ball stud 13 in a tightening direction toward base portion 28a until internal thread portion 40 is tightly engaged with base portion 28a, concurrent rotation prevention plate 16 is firmly fastened to ball stud 13. Junction face 35 of concurrent rotation prevention plate 16 is pressed against seat surface 30. As shown in FIG. 4, a radius corner 27a fits in annular recess 41 at the junction of base portion 28a and flange portion 27. Junction face 35 and seat surface 30 come snugly into contact with each other.

Concurrent rotation prevention plate 16 is not limited to the shape described above but can be of any shape as long as contact face 36 has a larger area than seat surface 30 of ball stud 13.

Furthermore, diameter D1 of shank portion 28 may be greater than a diameter of shank portion 26. Since the ball joint according to the present invention is configured so that concurrent rotation prevention plate 16 is affixed to stud portion 25, it is possible to make the frictional force at contact face 36 between attached item 51 and concurrent rotation prevention plate 16 greater than the rotational force applied to the ball stud by ensuring that contact face 36 has a larger area than seat surface 30. Therefore, when nut 61 rotates, ball stud 13 is prevented from rotating along with nut 61 without the requirement for any additional tools or particular operation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint, comprising:

a ball stud having a ball portion at a first end and a stud portion at a second end;

said stud portion having a threaded portion;

a seat surface on a portion of said ball stud adjacent said threaded portion and facing toward said threaded portion;

said threaded portion being effective for receiving an attached item thereon and effective for securing said attached item to said ball stud by receiving a nut on said threaded portion;

a region between said ball portion and said nut, said region being effective to hold said attached item between said ball portion and said nut;

a concurrent rotation prevention plate affixed to said stud portion of said ball stud so that it is clamped against said seat surface;

a contact face on said concurrent rotation prevention plate for contacting said attached item; and said contact face having a larger area than said seat surface.

2. A ball joint according to claim 1, further comprising:

a junction face on an opposite side of said concurrent rotation prevention plate;

said junction face contacting said seat surface; and said junction face having a larger area than said seat surface.

3. A ball joint according to claim 1, wherein said concurrent rotation prevention plate is screwed to said stud portion.

4. A ball joint according to claim 1, wherein:

said threaded portion of said stud portion has a minor diameter D2 and a major diameter D3;

an unthreaded base portion of said stud portion has a diameter D1;

said diameter D1 is greater than said minor diameter D2; and said major diameter D3 is greater than said diameter D1.

5. A ball joint according to claim 4, wherein:

said concurrent rotation prevention plate has a threaded hole substantially centered therein;

said threaded hole has a minor diameter D4;

said minor diameter D4 is greater than said minor diameter D2; and said diameter D1 is greater than said minor diameter D4.

6. A ball joint, comprising:

a ball stud having a ball portion at a first end and a stud portion at a second end;

said stud portion having a threaded portion;

a seat surface on a portion of said ball stud adjacent said threaded portion and facing towards said threaded portion;

said threaded portion being effective for receiving an attached item thereon and effective for securing said attached item to said ball stud by receiving a nut on said threaded portion:

a region between said ball portion and said nut, said region being effective to hold said attached item between said ball portion and said nut;

a concurrent rotation prevention plate affixed to said stud portion of said ball stud so that it is clamped against said seat surface;

a contact face on said concurrent rotation prevention plate for contacting said attached item;

said contact face having a larger area than said seat surface;

said threaded portion of said stud portion having a minor diameter D2 and a major diameter D3;

an unthreaded base portion of said stud portion having a diameter D1;

said diameter D1 being greater than said minor diameter D2;

said major diameter D3 being greater than said diameter D1;

said concurrent rotation prevention plate having a threaded hole substantially centered therein;

said threaded hole having a minor diameter D4;

said minor diameter D4 being greater than said minor diameter D2; and said diameter D 1 being greater than said minor diameter D4.

* * * * *